United States Patent
Lee

(10) Patent No.: US 6,373,527 B1
(45) Date of Patent: Apr. 16, 2002

(54) HIGH DEFINITION TELEVISION FOR SIMULTANEOUSLY DISPLAYING PLURAL IMAGES CONTAINED IN BROADCASTING SIGNALS OF MUTUALLY DIFFERENT BROADCASTING SYSTEMS

(75) Inventor: Tae-Sung Lee, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/109,935

(22) Filed: Jul. 2, 1998

(30) Foreign Application Priority Data

Jul. 3, 1997 (KR) .............................. 97-30797

(51) Int. Cl.⁷ .......................... H04N 5/46; H04N 5/445
(52) U.S. Cl. ........................ 348/564; 348/555; 348/558
(58) Field of Search .................. 348/554, 555, 348/556, 558, 563, 564, 565, 568, 913; 375/316; H04N 3/27, 5/46, 5/45, 5/445

(56) References Cited

U.S. PATENT DOCUMENTS

| | | | |
|---|---|---|---|
| 5,255,211 A | | 10/1993 | Redmond .................. 364/578 |
| 5,353,065 A | * | 10/1994 | Katsumata et al. ......... 348/556 |
| 5,453,796 A | * | 9/1995 | Duffield et al. ............. 348/565 |
| 5,504,535 A | * | 4/1996 | Abe ........................... 348/565 |
| 5,592,235 A | * | 1/1997 | Park et al. ................... 348/555 |
| 5,680,177 A | * | 10/1997 | Abe ........................... 348/564 |
| 5,699,123 A | * | 12/1997 | Ebihara et al. ............. 348/445 |
| 5,875,000 A | * | 2/1999 | Yamaguchi ................. 348/563 |
| 5,969,769 A | * | 10/1999 | Hamadate ................... 348/568 |
| 6,025,878 A | * | 2/2000 | Boyce et al. ............... 348/556 |

* cited by examiner

Primary Examiner—Michael Lee
Assistant Examiner—Brian P. Yenke
(74) Attorney, Agent, or Firm—Sughrue Mion, PLLC

(57) ABSTRACT

A high definition television (HDTV) for displaying an image contained in a broadcasting signal of mutually different broadcasting systems is provided. The HDTV restores a first image signal which is an image signal contained in an HD digital broadcasting signal and a second image signal which is an image signal contained in an NTSC analog broadcasting signal which are input from an antenna and an external input port, and format-converts each restored image signal into an image signal having a predetermined frame format. An image signal synthesizer including two memories and a timing signal generator time-base-compresses the format-converted first and second image signals so as to correspond to a main picture and a sub-picture of a PIP image to be displayed, and synthesizes the first and second image signals into a single PIP image signal. A CRT displays a PIP image contained in the PIP image signal on a screen.

11 Claims, 2 Drawing Sheets

HIGH DEFINITION TELEVISION FOR SIMULTANEOUSLY DISPLAYING PLURAL IMAGES CONTAINED IN BROADCASTING SIGNALS OF MUTUALLY DIFFERENT BROADCASTING SYSTEMS

BACKGROUND OF THE INVENTION

1. Field of the Invention

The present invention relates to a high definition television (HDTV) for displaying images contained in broadcasting signals of mutually different broadcasting systems, and more particularly, to an HDTV for displaying images contained in a digital broadcasting signal of an HDTV system and an analog broadcasting signal of a PAL (Phase Alternation by Line) system or an NTSC (National Television System Committee) system.

2. Description of the Related Art

As is well known, a frame format of a digital broadcasting signal according to an HDTV system is considerably different from that of an analog broadcasting signal of an NTSC system or a PAL system. A frame format refers to a vertical frequency which is the number of frames per second of an image signal contained in a broadcasting signal, a horizontal frequency which is the number of horizontal lines per second of an image signal contained in a broadcasting signal, and an aspect ratio of an image to be displayed. In the frame format, the horizontal frequency and the aspect ratio of an image signal contained in the high definition (HD) digital broadcasting signal are 31.50 KHz and 16:9, respectively. Meanwhile, in the case of an image signal contained in the NTSC analog broadcasting signal, the horizontal frequency and the aspect ratio are 15.75 KHz and 4:3, respectively. Also, in a digital broadcasting signal according to the HDTV system, the frame format differs slightly according to the HDTV system specified in each country.

Due to the above differences, the HDTV for displaying the image signal contained in the conventional HD digital broadcasting signal or the NTSC analog broadcasting signal comprises an HD digital broadcasting signal processor for restoring a first image signal which is an image signal contained in the HD digital broadcasting signal, an NTSC analog broadcasting signal processor for restoring a second image signal which is an image signal contained in the NTSC analog broadcasting signal, two format converters, and a switch for selectively outputting only one image signal among the first and second image signals according to a user command. One of the two format converters is a first format converter for converting a frame format of the first image signal into a frame format of the HDTV system set during manufacturing, and the other is a second format converter for converting a frame format of the second image signal contained in the NTSC analog broadcasting signal into a frame format which is the same as that of the first image signal whose format has been converted by the first format converter. However, since such a conventional HDTV selectively outputs only one of a plurality of image signals contained in the broadcasting signals of mutually different broadcasting systems, the HDTV cannot simultaneously display on a screen a plurality of images whose broadcasting systems differ from each other.

SUMMARY OF THE INVENTION

To solve the above problems, it is an object of the present invention to provide an HDTV for synthesizing a plurality of image signals contained in the broadcasting signals of mutually different broadcasting systems into a single picture-in-picture (PIP) image signal and displaying the synthesized PIP image signal on a screen, using an image signal synthesizer comprising two memories for storing a respectively format-converted image signal and a timing signal generator for time-base-compressing each image signal stored in the two memories and generating a timing signal for alternately outputting each stored image signal.

To accomplish the above object of the present invention, there is provided an HDTV for displaying images contained in an HD digital broadcasting signal and an analog broadcasting signal input via an antenna or an external input port on a screen, the HDTV comprising: a first broadcasting signal processor for restoring a first image signal which is an image signal contained in the HD digital broadcasting signal; a second broadcasting signal processor for restoring a second image signal which is an image signal contained in the analog broadcasting signal; a host computer; a first format converter for converting the frame format of the first image signal restored by the first broadcasting signal processor into a predetermined frame format under the control of the host computer; a second format converter for converting the frame format of the second image signal restored by the second broadcasting signal processor into the predetermined frame format; an image signal synthesizer for synthesizing the first and second image signals format-converted by the first and second format converters into a single PIP image signal; and a display module for visually displaying the PIP image signal on the screen.

BRIEF DESCRIPTION OF THE DRAWINGS

The above object and advantages of the present invention will be apparent by describing the structure and operation thereof in detail with reference to the attached drawings in which.

DETAILED DESCRIPTION OF THE PREFERRED EMBODIMENTS

Preferred embodiments of the present invention will be described with reference to the accompanying drawings.

Figure 1:
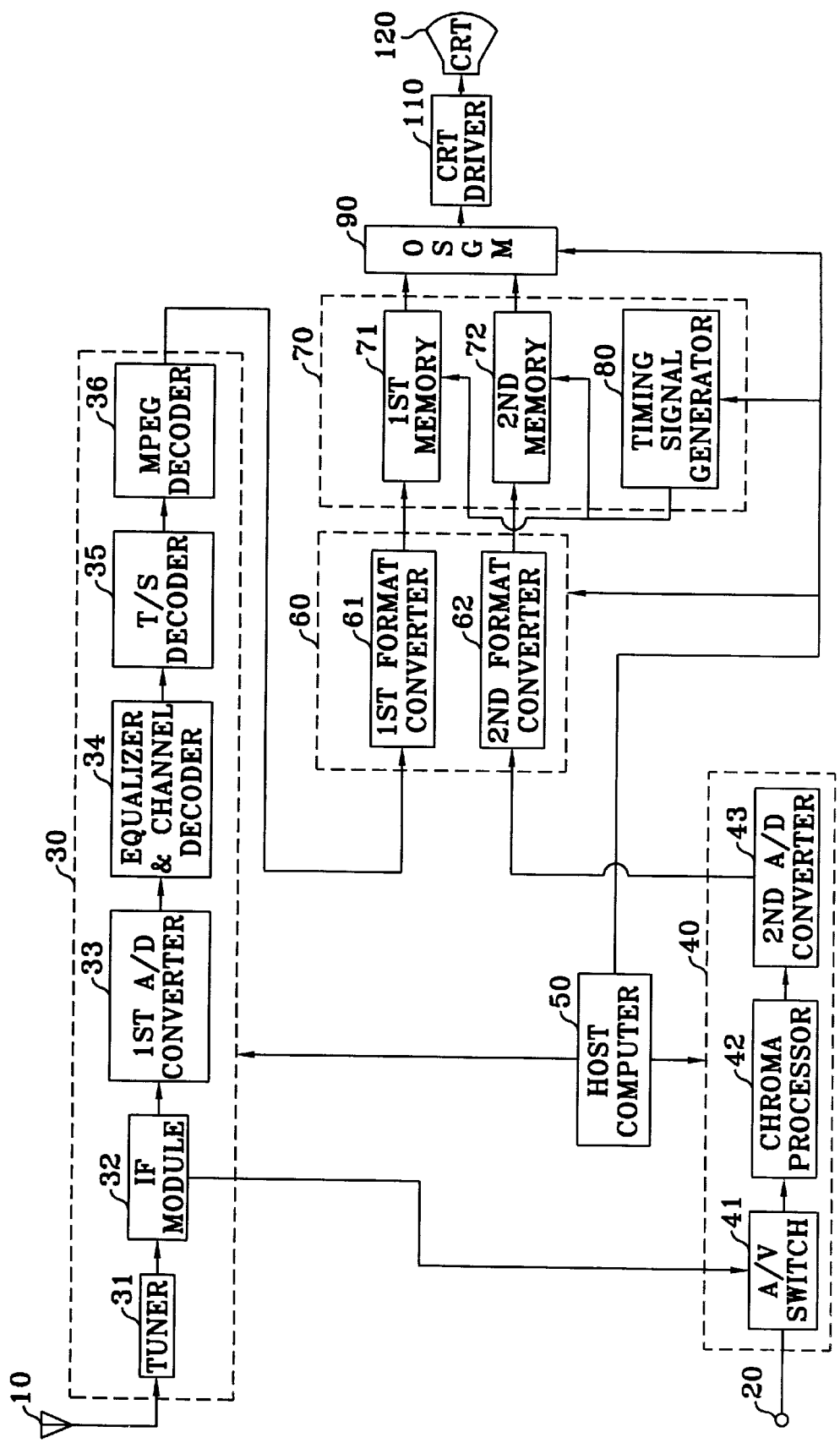
FIG. 1 shows the structure of an HDTV compatible with an HD digital broadcasting signal and an NTSC analog broadcasting signal according to an embodiment of the present invention.

FIG. 1 shows the structure of an HDTV compatible with an HD digital broadcasting signal and an NTSC analog broadcasting signal according to an embodiment of the present invention. An HDTV of FIG. 1 receives an HD digital broadcasting signal and an NTSC analog broadcasting signal using a first antenna 10 connected to an HD digital broadcasting signal processor 30 and an external input port 20 connected to an NTSC analog broadcasting signal processor 40. For convenience of explanation, the image signal and the audio signal in the HD digital broadcasting signal received via the first antenna 10 are encoded by the MPEG-2 (Moving Picture Experts Group-2) encoding system and the AC-3 (Audio Code-3) system, respectively, and multiplexed by the T/S (Transport Stream) encoding system. The invention is not limited to this arrangement, however.

A tuner 31 receives only a broadcasting signal of a channel selected by a user via the first antenna 10 and modulates the received broadcasting signal into an intermediate frequency (IF) signal. An IF module 32 modulates the IF signal received from the tuner 31 into a baseband broadcasting signal and outputs the broadcasting signal to a first analog-to-digital (A/D) converter 33 and an NTSC analog broadcasting signal processor 40. In more detail, the IF module 32 outputs the broadcasting signal to the first A/D converter 33 in the HD digital broadcasting signal processor 30 when the broadcasting signal modulated into the baseband broadcasting signal by the IF module 32 is the HD digital broadcasting signal, and outputs the broadcasting signal to an A/V (audio/video) switch 41 in the NTSC analog broadcasting signal processor 40 when the broadcasting signal modulated into the baseband broadcasting signal by the IF module 32 is the NTSC analog broadcasting signal. The HD digital broadcasting signal processor 30 is a block for restoring the first image signal contained in the HD digital broadcasting signal. The first A/D converter 33 in the HD digital broadcasting signal processor 30 converts the HD digital broadcasting signal received from the IF module 32 into a digital signal, and then outputs the converted result to an equalizer and channel decoder 34. The equalizer and channel decoder 34 equalizes and channel-decodes the HD digital broadcasting signal which is a digital signal received from the first A/D converter 33 and then outputs the resultant signal to a T/S decoder 35 which is a type of demultiplexer. The T/S decoder 35 demultiplexes the HD digital broadcasting signal received from the equalizer and channel decoder 34. As a result, the HD digital broadcasting signal is separated into a first image signal and a first audio signal which are an image signal and an audio signal which exist prior to being multiplexed by a T/S encoder. The first audio signal separated by the T/S decoder 35 is decoded and amplified by an AC-3 decoder (not shown) and a tone amplifier (not shown), and then the decoded and amplified audio signal is audibly output via a speaker (not shown). The first image signal separated by the T/S decoder 35 is output to an MPEG decoder 36. The MPEG decoder 36 decodes the first image signal received from the T/S decoder 35 and outputs the decoded first image signal to a first format converter 61 in a format conversion portion 60.

The NTSC analog broadcasting signal processor 40 is a block for restoring and A/D converting the second image signal contained in the NTSC analog broadcasting signal. The A/V switch 41 in the NTSC analog broadcasting signal processor 40 outputs one of the NTSC analog broadcasting signals received from the IF module 32 and the external input port 20 to a chroma processor 42. The chroma processor 42 generates a luminance signal Y, a first color difference signal R−Y and a second color difference signal B−Y being the second image signal from the NTSC analog broadcasting signal received from the A/V switch 41 and then outputs the generated signals to a second A/D converter 43. The second A/D converter 43 A/D converts the luminance signal Y, the first color difference signal R−Y and the second color difference signal B−Y, all of which are received from the chroma processor 42, and outputs the A/D converted second image signal to a second format converter 62 in the format conversion portion 60.

The host computer 50 is a block for controlling the operation of each component according to a user command input from a remote controller (not shown) or a control panel (not shown). The host computer 50 discriminates the frame format of the first image signal based on the frame format information contained in the header region of the first image signal output from the HD digital broadcasting signal processor 30 and controls the format conversion operation of the first format converter 61 according to the discrimination result. The format conversion portion 60 is a block for converting the frame formats of the first and second image signals respectively received from the HD digital broadcasting signal processor 30 and the NTSC analog broadcasting signal processor 40, into a predetermined frame format. The first format converter 61 converts the frame format of the first image signal received from the MPEG decoder 36 into a frame format having a vertical frequency of 30 Hz, a horizontal frequency of 15.75 KHz and an aspect ratio of 16:9, under the control of the host computer 50. The second format converter 62 converts the frame format of the second image signal received from the second A/D converter 43 into the same frame format as the format of the first image signal format-converted by the first format converter 61. As a result, the first image signal format-converted by the first format converter 61 and the second image signal format-converted by the second format converter 62 have the same frame format.

An image signal synthesizer 70 is a block for synthesizing the first and second image signals format-converted by the format converters 61 and 62, respectively into a single image signal. A first memory 71 in the image signal synthesizer 70 stores go the first image signal format-converted by the first format converter 61, and outputs the stored first image signal to an on-screen-graphic module (OSGM) 90, sequentially. A second memory 72 stores the second image signal format-converted by the second format converter 62, and outputs the stored second image signal to the OSGM 90, sequentially. Each memory 71 and 72 operates only when a timing signal is applied.

A timing signal generator 80 generates a timing signal including a read clock signal and a write clock signal. The frequency values of the read clock signal and the write clock signal are determined under the control of the host computer 50. As a result, the first and second image signals respectively format-converted by the first and second format converters 61 and 62 are time-base-compressed at a ratio of a write clock frequency value with respect to a read clock frequency value of the timing signal applied to each memory 71 or 72, and then the results are stored in the first and second memories 71 and 72, respectively. The timing signal generated by the timing signal generator 80 is applied consistently or alternately to any one of the first and second memories 71 and 72 under the control of the host computer 50. The OSGM 90 generates an on-screen character data representing a current operation state of the HDTV and a fast blanking signal for erasing the image signals in an area on which the on-screen character data is displayed, under the control of the host computer 50, and synthesizes the on-screen character data into a predetermined position of the image signal received from the first and second memories 71 and 72 using the fast blanking signal. A cathode ray tube (CRT) 120 receives the image signal synthesized with the on-screen character from a CRT driver 110, and visually displays the images contained in the image signals on a screen (not shown).

The HDTV as described above provides a function of simultaneously displaying a plurality of images contained in the broadcasting signals of mutually different broadcasting systems according to a user selection. The function will be described below in the case when a PIP image is displayed. If a command for displaying the first image contained in the HD digital broadcasting signal on a main picture and displaying the second image contained in the NTSC analog broadcasting signal on a sub-picture is input from the host computer 50 via the remote controller (not shown) or the control panel (not shown), the timing signal generator 80 in the image signal synthesizer 70 generates a timing signal including a read clock signal and a write clock signal under the control of the host computer 50 and applies the generated timing signal to the first and second memories 71 and 72 alternately.

During the time when the timing signal is applied to the first memory 71, the timing signal generator 80 supplies a timing signal whose ratio of the frequency value of a write clock signal with respect to the frequency value of a read clock signal is one, to the first memory 71. Accordingly, the first image signal output from the first format converter 61 is not time-base-compressed and is stored in the first memory 71 as it is.

During the time when the timing signal is applied to the second memory 72, the timing signal generator 80 supplies a timing signal having a ratio of the frequency value of a write clock signal with respect to the frequency value of a read clock signal, which is the same as the ratio of the size of a sub-picture with respect to the size of a main picture for a PIP image to be displayed. Accordingly, the second image signal output from the second format converter 62 is time-base-compressed into the size of the sub-picture to be displayed on the screen and then stored in the second memory 72.

Meanwhile, if the timing signal is applied, the first memory 71 sequentially outputs the stored first image signal. When the position of the output first image signal reaches the start position of the sub-picture, the timing signal is not applied to the first memory 71 but to the second memory 72. When the timing signal is applied to the second memory 72, the time-base-compressed second image signal is sequentially output from the second memory 72. When the second image signal with respect to the one horizontal line is completely output, the first timing signal is not applied to the second memory 72 but to the first memory 71. By repeating the above process, the first image signal contained in the HD digital broadcasting signal and the second image signal contained in the NTSC analog broadcasting signal are synthesized into a single PIP image signal. The PIP image signal passes through the OSGM 90 and the CRT driver 110 and is applied to the CRT 120. The PIP image contained in the PIP image signal is displayed on the screen of the CRT 120.

Figure 2:
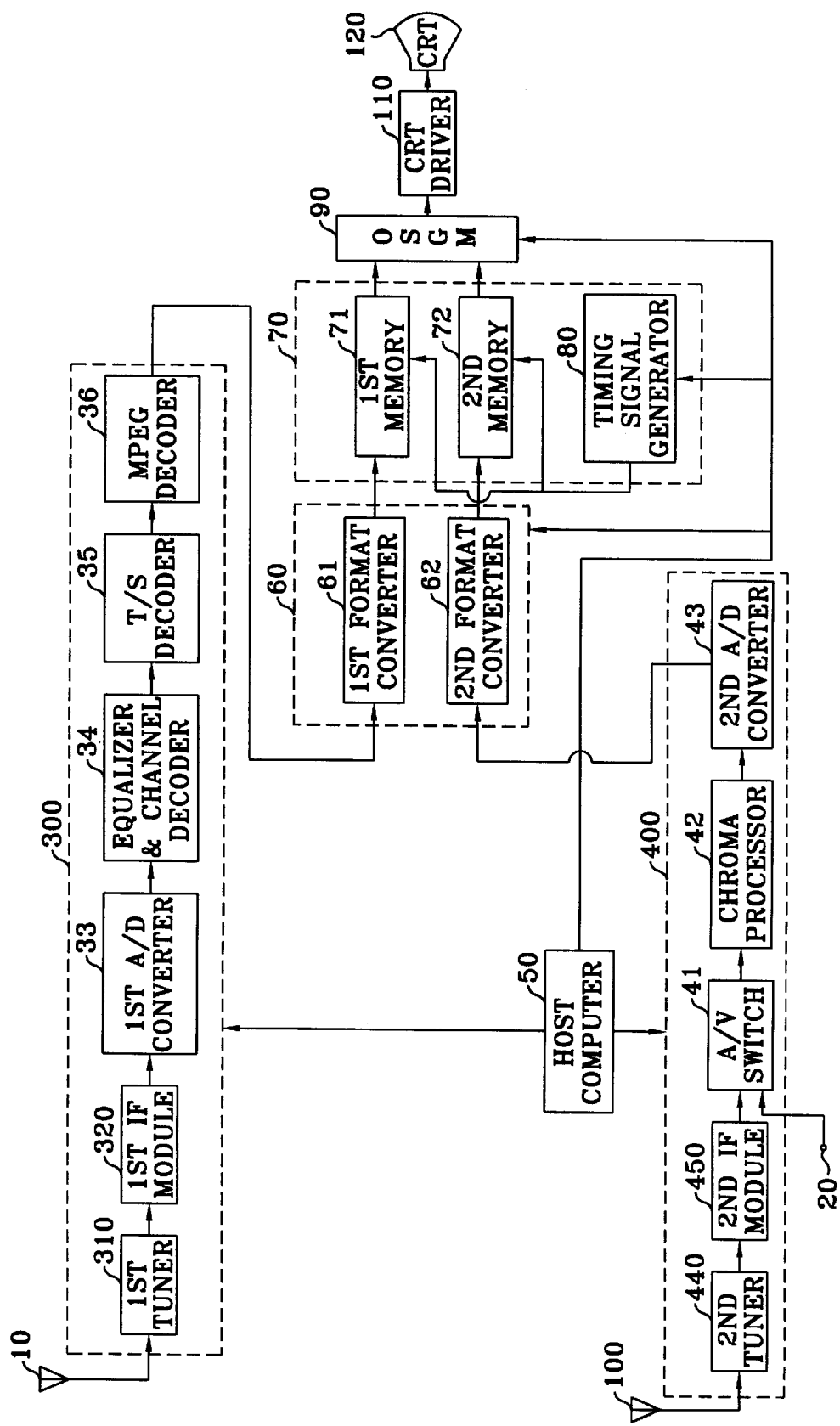
FIG. 2 shows the structure of an HDTV compatible with an HD digital broadcasting signal and an NTSC analog broadcasting signal according to another embodiment of the present invention.

FIG. 2 shows the structure of an HDTV compatible with an HD digital broadcasting signal and an NTSC analog broadcasting signal according to another embodiment of the present invention. The HDTV of FIG. 2 further comprises a second antenna 100, a second tuner 440, and a second IF module 450, when compared with the HDTV of FIG. 1. The second tuner 440 receives only an NTSC analog broadcasting signal which is selected by a user among the broadcasting signals received via the second antenna 440, and modulates the received NTSC analog broadcasting signal into an IF signal. The second IF module 450 modulates the IF band NTSC analog broadcasting signal received from the second tuner 440 into a baseband broadcasting signal, and then outputs the baseband broadcasting signal to the A/V switch 41. The first tuner 30 in the HD digital broadcasting signal processor 300 receives only the HD digital broadcasting signal of a channel selected by the user and modulates the received HD digital broadcasting signal into an IF signal. The first IF module 320 modulates the IF band HD digital broadcasting signal into a baseband broadcasting signal. The functions of the other components except for the above additional components are the same as those of FIG. 1 having the same reference numerals. Thus, the HDTV of FIG. 2 displays the PIP images including the images contained in the broadcasting signals of mutually different formats on the screen of the CRT 120, in the same manner as that of the FIG. 1 HDTV.

In the HDTVs as shown in FIGS. 1 and 2, it will be apparent to a person skilled in the art that the NTSC analog broadcasting signal processor 40 and the second format converter 62 can be replaced by a block for restoring an analog broadcasting signal of the PAL system or the SECAM (Sequential Couleur a Memoire) system, and a block for converting the frame format of the image signal contained in the analog broadcasting signal of the PAL system or the SECAM system into a predetermined frame format, in order to be compatible with the analog broadcasting signal of the PAL system or the SECAM system as well as the analog broadcasting signal of the NTSC system.

As described above, the HDTVs according to the embodiments of the present invention each convert the frame formats of the first image signal and the second image signal contained in the HD digital broadcasting signal and the NTSC analog broadcasting signal received from the first antenna 10 and the external input port 20, respectively, into a predetermined frame format using the format converters 61 and 62. In the case that the user selects a display of the PIP images, the two memories 71 and 72 and the timing signal generator 80 in the image signal synthesizer 70 time-base-compresses the first and second image signals into a size corresponding to the main picture and the sub-picture of the PIP image, respectively, and synthesizes the time-base-compressed first and second image signals into a single PIP image signal. The CRT 120 visually displays the PIP image signal on the screen.

Thus, the HDTV according to the present invention provides an effect of simultaneously displaying the first image contained in the digital broadcasting signal of the HDTV system and the second image contained in the analog broadcasting signal of the PAL system or the NTSC system, on the screen.

While only certain embodiments of the invention have been specifically described herein, it will be apparent that numerous modifications may be made thereto without departing from the spirit and scope of the invention.

What is claimed is:

1. A high definition television (HDTV) for displaying on a screen images contained in a high definition (HD) digital broadcasting signal and an analog broadcasting signal input via an antenna or an external input port, the HDTV comprising:

a first broadcasting signal processor for restoring a first image signal which is an image signal contained in the HD digital broadcasting signal;

a second broadcasting signal processor for restoring a second image signal which is an image signal contained in the analog broadcasting signal;

a host computer;

a first format converter for converting the frame format of the first image signal restored by the first broadcasting signal processor into a predetermined frame format under the control of the host computer, wherein the host computer discriminates the frame format of the first image signal restored by the first signal processor and controls the first format converter based on the discriminated result;

a second format converter for converting the frame format of the second image signal restored by the second broadcasting signal processor into the predetermined frame format;

an image signal synthesizer for synthesizing the first and second image signals format-converted by the first and second format converters into a single picture-in-picture (PIP) image signal; and a display module for visually displaying the PIP image signal on the screen.

2. The HDTV according to claim 1, wherein said image signal synthesizer comprises:

a timing signal generator for generating a timing signal;

a first memory for time-base-compressing the first image signal format-converted by the first format converter and storing and outputting the time-base-compressed result, during the time when the timing signal is input; and a second memory for time-base-compressing the second image signal format-converted by the second format converter and storing and outputting the time-base-compressed result, during the time when the timing signal is input, and wherein said timing signal generator alternately applies the timing signal to the first and second memories, so that the respective second image signals stored in the first and second memories are output alternately.

3. The HDTV according to claim 2, wherein said image signal synthesizer further comprises an on-screen-graphic module (OSGM) for generating on-screen character data and a fast blanking signal representing the operational state of the HDTV and synthesizing the on-screen character data in a predetermined area of the PIP image signal using the fast blanking signal, and wherein said display module visually displays the PIP image signal synthesized with the on-screen character data by the OSGM on the screen.

4. The HDTV according to claim 1, wherein said first image signal contained in the HD digital broadcasting signal is an image signal encoded according to the MPEG-2 system, and said first broadcasting signal processor comprises an MPEG decoder.

5. The HDTV according to claim 1, wherein said analog broadcasting signal is an analog broadcasting signal according to the NTSC system and said second broadcasting signal processor restores and A/D converts the analog broadcasting signal according to the NTSC system.

6. The HDTV according to claim 1, wherein said analog broadcasting signal is an analog broadcasting signal according to the PAL system and said second broadcasting signal processor restores and A/D converts the analog broadcasting signal according to the PAL system.

7. The HDTV according to claim 1, wherein said analog broadcasting signal is an analog broadcasting signal according to the SECAM system and said second broadcasting signal processor restores and A/D converts the analog broadcasting signal according to the SECAM system.

8. The HDTV according to claim 1, wherein said first and second format converters each convert the frame formats of the first and second image signals into a frame format having a vertical frequency of 30 Hz, a horizontal frequency of 31.50 KHz and an aspect ratio of 16:9.

9. A high definition television (HDTV) for displaying on a screen images contained in a high definition (HD) digital broadcasting signal and an analog broadcasting signal input via an antenna or an external input port, the HDTV comprising:

a first broadcasting signal processor for restoring a first image signal which is an image signal contained in the HD digital broadcasting signal;

a second broadcasting signal processor for restoring a second image signal which is an image signal contained in the analog broadcasting signal;

a host computer;

a first format converter for converting the frame format of the first image signal restored by the first broadcasting signal processor into a predetermined frame format under the control of the host computer;

a second format converter for converting the frame format of the second image signal restored by the second broadcasting signal processor into the predetermined frame format;

an image signal synthesizer for synthesizing the first and second image signals format-converted by the first and second format converters into a single picture-in-picture (PIP) image signal; and a display module for visually displaying the PIP image signal on the screen, wherein said first broadcasting signal processor comprises:

a tuner for modulating only the broadcasting signal of a desired channel among the broadcasting signals received via the antenna into an intermediate frequency (IF) signal;

an IF module for modulating the broadcasting signal modulated into the IF signal by the tuner into a baseband broadcasting signal;

a first analog-to-digital (A/D) converter for A/D converting the HD digital broadcasting signal modulated into the baseband broadcasting signal by the IF module;

an equalizer for equalizing the HD digital broadcasting signal converted into a digital signal by the first A/D converter;

a channel decoder for channel-decoding the HD digital broadcasting signal equalized by the equalizer;

a demultiplexer for separating the first image signal from the HD digital broadcasting signal channel-decoded by the channel decoder; and an image signal decoder for receiving and decoding the first image signal separated from the HD digital broadcasting signal by the demultiplexer, and wherein said IF module outputs the broadcasting signal to the second broadcasting signal processor when the broadcasting signal received from the antenna is an analog broadcasting signal.

10. The HDTV according to claim 9, wherein said second broadcasting signal processor comprises:

an external input port;

an audio/video (A/V) switch for selectively outputting only an analog broadcasting signal among the analog broadcasting signal received from the IF module and the external input port under the control of the host computer; and a chroma processor for generating a luminance signal, a first color difference signal and a second color difference signal using the analog broadcasting signal received from the A/V switch, wherein the luminance signal, the first color difference signal and the second color difference signal are the second image signal; and a second A/D converter for A/D converting the second image signal restored by the chroma processor.

11. The HDTV according to claim 9, wherein said HD digital broadcasting signal is a multiplexed signal by a transport stream (T/S) encoder, and said demultiplexer is a T/S decoder.

* * * * *